(12) United States Patent
Rossato et al.

(10) Patent No.: US 8,711,943 B2
(45) Date of Patent: Apr. 29, 2014

(54) SIGNAL PROCESSING AND TIERED SIGNAL ENCODING

(76) Inventors: Luca Rossato, Milan (IT); Guido Meardi, Milan (IT)

(*) Notice: Subject to any disclaimer, the term of this patent is extended or adjusted under 35 U.S.C. 154(b) by 453 days.

(21) Appl. No.: 13/188,207

(22) Filed: Jul. 21, 2011

(65) Prior Publication Data
US 2013/0294523 A1 Nov. 7, 2013

(51) Int. Cl.
*H04N 7/50* (2006.01)
*H04N 7/30* (2006.01)

(52) U.S. Cl.
USPC ............ 375/240.18; 375/240.03; 375/240.23; 375/240.1; 375/286

(58) Field of Classification Search
None
See application file for complete search history.

(56) References Cited

U.S. PATENT DOCUMENTS

2006/0280271 A1* 12/2006 Oshikiri .................... 375/355
2008/0232452 A1* 9/2008 Sullivan et al. ............. 375/232

OTHER PUBLICATIONS

Ammar, Nejib et al., "Switched SVC Up-sampling Filter", Proposal, Jan. 14-20, 2006, Total pp. 6, Nokia Research Center, Thailand.
Segall, Andrew, "Study of Upsampling/Down-sampling for Spatial Scalability", Proposal, Oct. 14-21, 2005, Total pp. 18, Sharp Labs of America, France.
Beerman, Markus, "Non-linear Up-sampling for Spatial Scalability", Jul. 17-21, 2006, Total pp. 7, RWTH Aachen University, Germany.
Koen De Wolf et al., "Performance Evaluation of Adaptive Residual Interpolation, a Tool for Inter-layer Prediction in H.264/AVC Scalable Video Coding", 2007, Total pp. 10, Ghent University, Belgium.
Han, Woo-Jin, "Smoothed Reference Prediction for Single-Loop Decoding", Proposal, Jul. 24-29, 2005, Total pp. 14, Samsung Electronics Co., Ltd., Poland.
Shimauchi, Kazuhiro et al., "An Inter-Layer Estimation Method for SVC", Proposal, Oct. 20-27, 2006, Total pp. 12, Victor Company of Japan, Limited, China.
International Search Report from corresponding PCT application No. PCT/IB2012/053723, mailed Apr. 5, 2013, Total pp. 6.

* cited by examiner

*Primary Examiner* — Joseph Ustaris
*Assistant Examiner* — Maryam Nasri
(74) *Attorney, Agent, or Firm* — Chapin IP Law, LLC

(57) ABSTRACT

An encoder receives a signal. The encoder utilizes one or more downsample operations to produce downsampled renditions of the signal at successively lower levels of quality in the hierarchy. In a reverse direction, the encoder applies the one or more upsample operations to a downsampled rendition of the signal at a first level of quality to produce an upsampled rendition of the signal at a second level of quality in the hierarchy. The second level of quality is higher than the first level of quality. The one or more upsample operations and one or more downsample operations can be asymmetrical with respect to each other. That is, the function applied during downsampling can differ from the function applied when upsampling. The encoder produces residual data indicating a difference between the downsampled rendition of the signal at the second level of quality and the upsampled rendition of the signal at the second level of quality.

32 Claims, 12 Drawing Sheets

SIGNAL PROCESSING AND TIERED SIGNAL ENCODING

RELATED APPLICATIONS

This application is related to U.S. patent application Ser. No. 13/188,188 entitled "INHERITANCE IN A TIERED SIGNAL QUALITY HIERARCHY," filed on the same day as the present application, the entire teachings of which are incorporated herein by this reference.

This application is related to U.S. patent application Ser. No. 13/188,201 entitled "TIERED SIGNAL DECODING AND SIGNAL RECONSTRUCTION," filed on the same day as the present application, the entire teachings of which are incorporated herein by this reference.

This application is related to U.S. patent application Ser. No. 13/188,220 entitled "UPSAMPLING IN A TIERED SIGNAL QUALITY HIERARCHY," filed on the same day as the present application, the entire teachings of which are incorporated herein by this reference.

This application is related to U.S. patent application Ser. No. 13/188,226 entitled "SIGNAL PROCESSING AND INHERITANCE IN A TIERED SIGNAL QUALITY HIERARCHY," filed on the same day as the present application, the entire teachings of which are incorporated herein by this reference.

This application is related to U.S. patent application Ser. No. 13/188,237 entitled "TRANSMISSION OF RECONSTRUCTION DATA IN A TIERED SIGNAL QUALITY HIERARCHY," filed on the same day as the present application, the entire teachings of which are incorporated herein by this reference.

BACKGROUND

CPU (Central Processing Unit) efficiency matters both during encoding and decoding of a signal. Latest generation processors are becoming more and more parallel, with up to hundreds of simple cores on each single chip.

Unfortunately, by nature, traditional MPEG (Moving Pictures Expert Group) family codecs are structurally non-parallel. That stems from the fact that they are block-based, and each image block must be encoded and decoded sequentially, since to achieve efficient compression all blocks must be made to depend in some way on each other.

Via the introduction of so-called "slices" (basically, pieces of the image that are treated independently of one another, as if they were separate videos put one next to the other) into MPEG coding, the H.264 standard allows for processing of a few threads in parallel (typically 2 or 3 threads). Important algorithm elements such as de-blocking (i.e., a filter that "smoothes" the transitions among blocks to create a more uniform image) are typically global operations full of conditional instructions, which are unsuitable for applications including parallel CPUs.

Today's CPUs and GPUs (Graphics Processing Units) are typically very powerful; a single GPU can include several hundreds of computing cores to perform parallel processing of information. When using current technology, larger portions of an image can be stored in a processor cache for processing. The need to fragment images into a multitude of small blocks, which was a driving factor when MPEG was created, as processors from that era could only deal with very small chunks of video data at a time—and then only sequentially—no longer applies to modern CPUs and GPUs. Thus, a large portion of available processing power may go unused when implementing MPEG-like types of encoding/decoding, with blocking artifacts needlessly introduced into the signal.

Also, compared to what was current when MPEG was developed, modern day applications typically require much higher definition video encoding and much higher overall playback quality. In high-definition (HD), high-quality videos, there is a much larger difference between areas with low detail (potentially even out of focus) and areas with very fine detail. This makes the use of frequency-domain transforms such as those used in MPEG even more unsuitable for image processing and playback, since the range of relevant frequencies is getting much broader.

In addition, higher resolution images include a higher amount of camera noise and/or film grain, i.e., very detailed high-frequency pixel transitions that can be quite irrelevant for viewing and require many bits to encode.

Lastly, traditional codecs are ill-suited to perform efficiently with 3D or volumetric imaging, which is becoming more and more important in fields such as medical imaging, scientific imaging, etc.

Most target devices today support different playback resolutions and quality. So-called SVC (Scalable Video Coding), the current MPEG standard for scalability, has not been received favorably by the industry and shows little to non-existent adoption, because it is considered way too complex and somewhat bandwidth inefficient.

Moreover, encoded videos are plentiful; that is, a content provider typically doesn't have the time to customize encoder parameters and experiment with each specific video stream. Currently, content providers dislike that many encoding parameters must be manually tweaked (every time performing an encoding and checking the quality of results) in order to successfully encode a video.

As an alternative to MPEG standards for encoding/decoding, so-called image pyramids have been used for encoding/decoding purposes. For example, using Laplacian pyramids, conventional systems have created lower resolution images using Gaussian filters and then building the pyramid of the differences between the images obtained by upsampling with a rigidly programmed decoder back from the lower resolution levels to the original level.

Use of conventional Laplacian pyramid encoding has been abandoned. One deficiency of such transforms is that the authors were always trying to avoid distortions/artifacts in the downsampled image, so they always used Gaussian filtering, as it is the only type of filter that doesn't add any information of its own. However, the insurmountable problem with Gaussian filtering is that it introduces a blurring effect, such that when upscaling back to larger resolutions, there is a need for an inordinate amount of image correction information to reproduce the original image.

BRIEF DESCRIPTION

Embodiments herein deviate with respect to conventional systems and methods. For example, embodiments herein are directed to unique ways of processing and encoding signal information to reduce an amount of data that is needed to reconstruct a signal when decoding.

More specifically, one embodiment herein includes encoding a received signal at different levels of quality in a hierarchy. For example, an encoder receives a signal to be encoded. Initially, the encoder utilizes one or more downsample operations to produce downsampled renditions of the signal at successively lower levels of quality in the hierarchy. The encoder then applies one or more upsample operations to a downsampled rendition of the signal at a first level of quality to produce an upsampled rendition of the signal at a second (e.g., higher) level of quality in the hierarchy. As discussed herein, the upsample operations and downsample operations are asymmetrical with respect to each other. Each of the upsample and downsample operations each or both can be different non-linear functions.

One embodiment herein includes featuring several different downsampling and upsampling operations in a respective encoding loop to determine which operations are most suitable to reduce an amount of encoded data. In accordance with such an embodiment, the encoder produces and tests sets of residual data indicating a difference between a downsampled rendition of the signal and an upsampled rendition of the signal from a lower level of quality.

In accordance with further embodiments, at each level of quality in the hierarchy, the encoder implements a "lossy" encoding algorithm so as to reduce the entropy of residual data produced at each of the levels of quality. Reducing entropy can be achieved by altering or tweaking elements of the signal at each level of quality and estimating the impact on the entropy of the residuals at the higher levels.

In accordance with a more specific embodiment, the process of tweaking to improve (e.g., reduce) entropy can be repeated until one or more of the following conditions apply: a.) the entropy level achieved for a higher level of quality is below a satisfaction threshold value, b.) no additional alterations seem to improve the entropy of residual data for a given number of attempts, c) the encoder has performed a pre-set number of attempts to reduce the entropy, etc.

As further discussed herein, the entropy can be estimated using a proxy function, which calculates or estimates a number of bits, symbols, etc., required to indicate difference information for a level of quality.

In further embodiments, the encoder estimates the impact on entropy of residuals at higher levels of quality using a proxy function to identify an impact on entropy, without the need to fully encode the residuals at every tweaking. The proxy function can produce a metric such as a value indicating a percentage of residuals that are different from a value of zero or near zero value.

Optimization of downsampling operations and filters is not necessarily an objective of every embodiment discussed herein. In one embodiment, since the encoder already knows what linear or non-linear operations (e.g., bicubic filtering, unsharp masking, deblending, . . . ) will be used to upsample back to higher levels of quality at the decoding site, the encoder can be configured to optimize downsampling not so much to reduce artifacts in lower levels of quality, but so as to reduce the number of residuals (or, even more precisely, to reduce the entropy of residuals) after applying upsampling operations. Both the downsample and upsample functions can be non-linear types of functions.

As further discussed herein, downsampling of the signal during encoding can include implementing a tweaked bilinear filter process. In accordance with such an embodiment, the encoder initially downsamples from level n to level (n−1) using a downsample function such as a bilinear filter. The encoder focuses on each element and alters it in various directions. Every time the encoder alters an element, the encoder upsamples back to a higher level of quality (i.e., every pel/pixel in level n−1 influences a number of pixels in level n) to assess the entropy of residuals based on generating an appropriate entropy metric.

According to a generated entropy metric, for the new value of that specific pel/pixel in level n−1, the encoder finally selects the alteration that generates the lowest entropy of residuals in the next higher level of quality (e.g., level hierarchy). In order to do so, the encoder can leverage use of an iterative or looping algorithm. The iterative algorithm chooses a direction (e.g., up or down) in which to alter an element. If the entropy metric improves, the encoder continues with another alteration in the selected direction. The encoder can be configured to reduce a size of the alterations once it is closer to a minimum entropy value for the iterative tweaking routine.

In one embodiment, tweaking operations are done in parallel to reduce an amount of time needed to encode a received signal into multiple different levels of quality. Parallel processing can include use of all massively multi-core CPUs or GPUs. Each processor can be configured to process a selected portion of the overall signal.

Since different pels/pixels of level (n−1) may influence overlapping areas of level n, for each "parallel step" of the algorithm, the encoder can be configured to perform a global aggregation algorithm (potentially in a hierarchical way, e.g. single pel, then 4×4, then 16×16, etc., with local loops for a certain number of iterations before doing a global pass) to check whether tweaks to a sub-region negatively impact an entropy associated with the global set of residual data.

A specific implementation of the tweaking algorithm can also take into account different possible upsampling options such that at completion of the tweaking algorithm, the encoder knows the optimum level n−1 for each alternative upsampling technique. The encoder can select the upsampling or upscaling option that produces the lowest overall entropy metric for residual data at the next higher level.

Note additionally that, with sufficient encoder computing power, the encoder can be configured to tweak and encode a level of quality (n−2) based on processing of level n, not just based on level (n−1). In other words, the signal data at a lower level of quality can be tweaked to reduce entropy at multiple different higher levels of quality in the hierarchy. Additionally, the same approach can be used also modify (or enrich) the operations and filters that are leveraged to upscale back from lower levels to higher levels. For instance, if the encoder tweaked lower levels based on multiple higher levels of quality, the encoder and decoder can reconstruct the signal at higher levels of quality in the hierarchy based on the information contained in multiple lower levels.

Note that the received signal as discussed herein can be of any suitable type. In one embodiment, the signal represents image data. In accordance with such an embodiment, the encoder encodes a signal at lower resolutions or lower levels of quality based on producing tiered sets of encoded data. Utilizing sets of encoded data starting from a given level of quality (e.g., lowest level) in the hierarchy, the tiered sets of encoded data can be decoded and used to reconstruct an original image or a "lossy" replica of the original image for playback.

These and other embodiment variations are discussed in more detail below.

As mentioned above, note that embodiments herein can include a configuration of one or more computerized devices, routers, network, workstations, handheld or laptop computers, or the like to carry out and/or support any or all of the method operations disclosed herein. In other words, one or more computerized devices or processors can be programmed and/or configured to operate as explained herein to carry out different embodiments.

In addition to the decoder and processing as discussed above, yet other embodiments herein include software programs to perform the steps and operations summarized above and disclosed in detail below. One such embodiment comprises a computer-readable, hardware storage resource (i.e., a non-transitory computer readable media) including computer program logic, instructions, etc., encoded thereon that, when performed in a computerized device having a processor and corresponding memory, programs and/or causes the processor to perform any of the operations disclosed herein. Such arrangements can be provided as software, code, and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes a computer-readable hardware storage medium having instructions stored thereon for supporting signal processing operations. For example, in one embodiment, the instructions, when carried out by a processor of a respective computer device, cause the processor to: receiving a signal; utilizing at least one downsample operation to produce downsampled renditions of the signal at successively lower levels of quality in the hierarchy; applying at least one upsample operation to a downsampled rendition of the signal at a first level of quality to produce an upsampled rendition of the signal at a second level of quality in the hierarchy, the second level of quality being higher than the first level of quality, the at least one upsample operation and at least one downsample operation possibly being asymmetrical with respect to each other; and producing residual data indicating a difference between the downsampled rendition of the signal at the second level of quality and the upsampled rendition of the signal at the second level of quality.

The ordering of the steps has been added for clarity sake. These steps can be performed in any suitable order.

Other embodiments of the present disclosure include software programs, firmware, and/or respective hardware to perform any of the method embodiment steps and operations summarized above and disclosed in detail below.

Also, it is to be understood that the system, method, apparatus, instructions on computer readable storage media, etc., as discussed herein can be embodied strictly as a software program, as a hybrid of software, firmware, and/or hardware, or as hardware alone such as within a processor, or within an operating system or within a software application, etc.

As discussed above, techniques herein are well suited for use in software, firmware, and/or hardware applications that encode signals. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended that each of the concepts can be executed independently of each other or in combination with each other. Accordingly, the one or more present inventions, embodiments, etc., as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to one embodiment, an encoder receives a signal. The encoder utilizes one or more downsample operations to produce downsampled renditions of the signal (i.e., signal data) at successively lower levels of quality in the hierarchy. In a reverse direction, the encoder applies the one or more upsample operations to a downsampled rendition of the signal at a first level of quality to produce an upsampled rendition of the signal at a second level of quality in the hierarchy. The second level of quality is higher than the first level of quality. The one or more upsample operations and one or more downsample operations can be asymmetrical with respect to each other. That is, the function applied during downsampling can be different from the function applied when upsampling. The encoder produces residual data indicating a difference between the downsampled rendition of the signal at the second level of quality and the upsampled rendition of the signal at the second level of quality.

Figure 1:
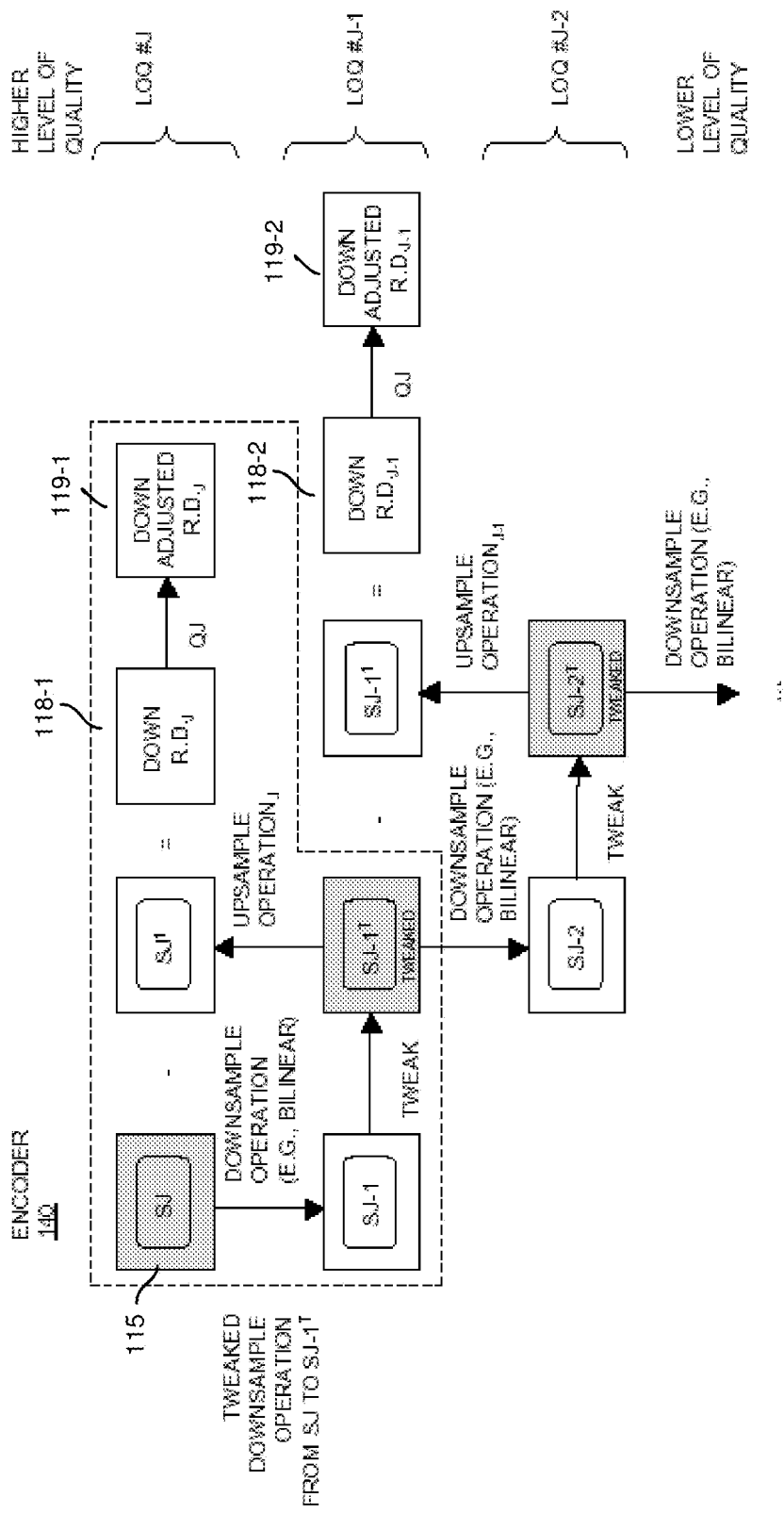
FIG. 1 is an example diagram of an encoder and downsampling of a signal according to embodiments herein.

FIG. 1 is an example diagram of an encoder and respective downsampling of a signal according to embodiments herein.

Encoder 140 receives signal 115. Signal 115 encoded by the encoder 140 can be any suitable type of data information.

By way of a non-limiting example, the signal 115 can be image data, symbols, etc., indicating settings of each of multiple signal elements (e.g., pels/plane elements, pixels/picture elements, voxels/volumetric picture elements, etc.) in a respective image. The image can be two dimensional (e.g., pictures, video frames, 2D motion maps, etc.), three-dimensional (e.g., 3D/volumetric images, holographic images, CAT-scans, medical/scientific images, 3D motion maps, etc.) or even featuring more than three dimensions. In accordance with such an embodiment, the settings of the signal elements (as specified by the signal 115) indicate how to reconstruct the respective image for playback on a device.

During encoding of signal 115, the encoder 140 uses one or more downsample operations and one or more upsample operations to produce sets of encoded signal data that are used by a decoder to reconstruct an original signal 115. One example of a decoder that uses the encoded data as discussed herein is described in related U.S. patent application Ser. No. 13/188,201 entitled "TIERED SIGNAL DECODING AND SIGNAL RECONSTRUCTION," filed on the same day as the present application, the entire teachings of which are incorporated herein by this reference.

The signal data as discussed below represents renditions of the signal 115 at the different levels of quality in the encoding hierarchy. Note that level of quality J may represent a highest level of quality or an intermediate level of quality in the hierarchy. In one embodiment, the encoder 140 processes signal data at pairs of levels in the hierarchy to perform downsampling of the signal into lower levels of quality.

Downsampling of the signal 115 can include applying a selected downsampling operation to signal data SJ at level of quality J to create signal data SJ-1 at level of quality J-1. For instance, the downsample operation can be a simple bilinear filter, or a more complex operation such as the application of a non-linear function, as previously discussed.

Note that signal data SJ-1 represents a lower resolution or lower level of quality than original signal 115; signal data SJ-2 represents a lower resolution or lower level of quality of signal 115 than signal data SJ-1, and so on.

Thus, the signal data at each respective level in the hierarchy represents the original signal, but at a lower level of quality. Typically, less and less data (e.g., bit information, symbols, etc.) is needed to define the signal at each successively lower level in the hierarchy.

In accordance with one embodiment, the encoder 140 downsamples the signal 115 into signal data SJ-1. Subsequent to initial downsampling of the signal data SJ to level of quality J-1, the encoder 140 tweaks or adjusts settings of individual elements in the signal data SJ-1 to identify which tweaked settings to signal data SJ-1 reduces an entropy associated with residual data produced for level of quality J.

More specifically, in one embodiment, the encoder 140 applies an upsample operation J to a first version of signal data SJ-$1^T$ to produce signal data SJ$^1$. The encoder 140 then calculates a difference between the signal data SJ and SJ$^1$ to produce residual data 118-1. Residual data 118-1 indicates modifications that need to be made to signal data SJ$^1$ to reproduce, with a desired accuracy, signal data SJ (e.g., signal 115).

In one embodiment, the encoder 140 applies quantization process QJ to produce residual data 119-1. Step QJ represents application of a function that adjusts the setting of individual values in the residual data 118-1 to be the same value or symbol if the respective magnitudes of such elements fall within a range or are above/below a threshold value. As an example, via quantization, the encoder 140 can identify settings of individual elements in the residual data 118-1 having a value falling in a range between −1.5 and +1.5. For those values that fall within this range, the encoder 140 sets such values in the adjusted residual data 119-1 to a predetermined value such as zero; the encoder 140 can identify settings of individual elements in the residual data 118-1 falling in a range between −7.5 and −6.5 and set such values in the adjusted residual data 119-1 to a setting of −7.0, and so on. Accordingly, the quantization QJ reduces an entropy of the residual data 118-1. That is, the values of residual data are modified so that they are more similar to each other.

In this example, note that if the signal data SJ is equal to the signal data SJ$^1$, then the produced residual data will be all zero values (e.g., minimum entropy). In such an instance, there would be no need to tweak signal data SJ-1 as there would be a lowest possible entropy associated with the residual data 118-1.

A more likely case is that the signal data SJ and SJ$^1$ will not be equal. Entropy of the residual data 118-1 and adjusted residual data 119-1 will likely be non-zero values. In this instance, assume that the residual data 118-1 and adjusted residual data 119-1 include non-zero values. High entropy of residual data is undesirable because it means that extra data must be used to reconstruct the original signal 115. It is typically desirable to reduce the overall amount of data needed to reconstruct the signal 115.

In one embodiment, to reduce an entropy of the residual data 119-1, the encoder 140 repeatedly tweaks the signal data SJ-1 and upsamples different versions of the tweaked signal data SJ-$1^T$ into signal data SJ$^1$ until the respective tweaks to individual elements of signal data SJ-1 result in a substantially lower or the lowest entropy of residual data 119-1.

Tweaking can be performed on a per element basis. That is, the encoder 140 can select an element in the signal data SJ-1 and repeatedly tweak a value of the element to identify a respective setting that reduces an entropy associated with residual data 119-1. The encoder can reduce a magnitude of the tweak to the selected element as the tweaked value becomes closer to producing a substantially lower entropy metric for the next level's residual data.

Upon identifying the appropriate best tweak to the selected element, the encoder 140 then saves the tweaked signal data for the element and stores it in signal data SJ-$1^T$.

Using each of the substantially best tweaks for previously tested elements, the encoder 140 then selects a next element in the signal data SJ-1 to tweak and repeats the above process to identify a best setting for the selected element, and so on.

Subsequent to completing a process of producing tweaked signal data SJ-$1^T$ for level of quality J-1 that reduces an entropy of residual data 119-1, the encoder 140 then repeats the same process for each next lower level of quality.

For example, at a next lower level of quality, the encoder 140 downsamples the signal data SJ-$1^T$ into signal data SJ-2. Subsequent to this downsampling, the encoder 140 tweaks or adjusts settings of individual elements in the signal data SJ-2 to identify which tweaked settings to signal data SJ-2 reduces an entropy associated with residual data 119-2 produced for level of quality J-1.

More specifically, in one embodiment, the encoder 140 applies an upsample operation J-1 to the signal data SJ-$2^T$ to produce signal data SJ-$1^1$. The encoder 140 then calculates a difference between the signal data SJ-$1^T$ and SJ-$1^1$ to produce residual data 118-2. The encoder 140 then applies quantization process to produce residual data 119-2.

As previously discussed, quantization can include application of a function that adjusts the setting of individual values in the signal data to be the same value or symbol if the respective magnitudes of such values fall within a range or are above/below a threshold value.

To reduce an entropy of the residual data 119-2, the encoder 140 repeatedly tweaks the signal data SJ-2 and upsamples the tweaked signal data SJ-$2^T$ into signal data SJ-$1^1$ until the respective tweaks to individual elements of signal data SJ-2 result in a substantially lower or the lowest entropy of residual data 119-2.

As previously mentioned, tweaking can be performed on a per element basis. That is, the encoder can select an element in the signal data SJ-2 and repeatedly tweak a value of the selected element to identify a setting that reduces an entropy associated with residual data 119-2. Upon identifying appropriate tweaks to the selected element, the encoder 140 then saves the tweaked signal data for the element and stores it in signal data SJ-$2^T$.

The encoder 140 then selects a next element in the signal data SJ-1 to tweak and repeats the above process to identify a best setting for each selected element, and so on.

Subsequent to completing a process of producing tweaked signal data SJ-$2^T$ for level of quality J-2 that reduces an entropy of residual data 119-2, the encoder 140 then repeats the same process for each next lower level of quality. Accordingly, the encoder 140 produces tweaked sets of signal data at lower levels of quality in the hierarchy.

Note that the encoder 140 can be configured to test multiple different upsample options (e.g., one or more upsample operations) to identify which of multiple upsample options produces the lowest entropy of residual data. In other words, the encoder 140 can repeat the process of downsampling and tweaking for each of multiple upsample operations to identify which upsample operation(s) best reduce the entropy of residual data at the next higher level of quality.

Figure 2:
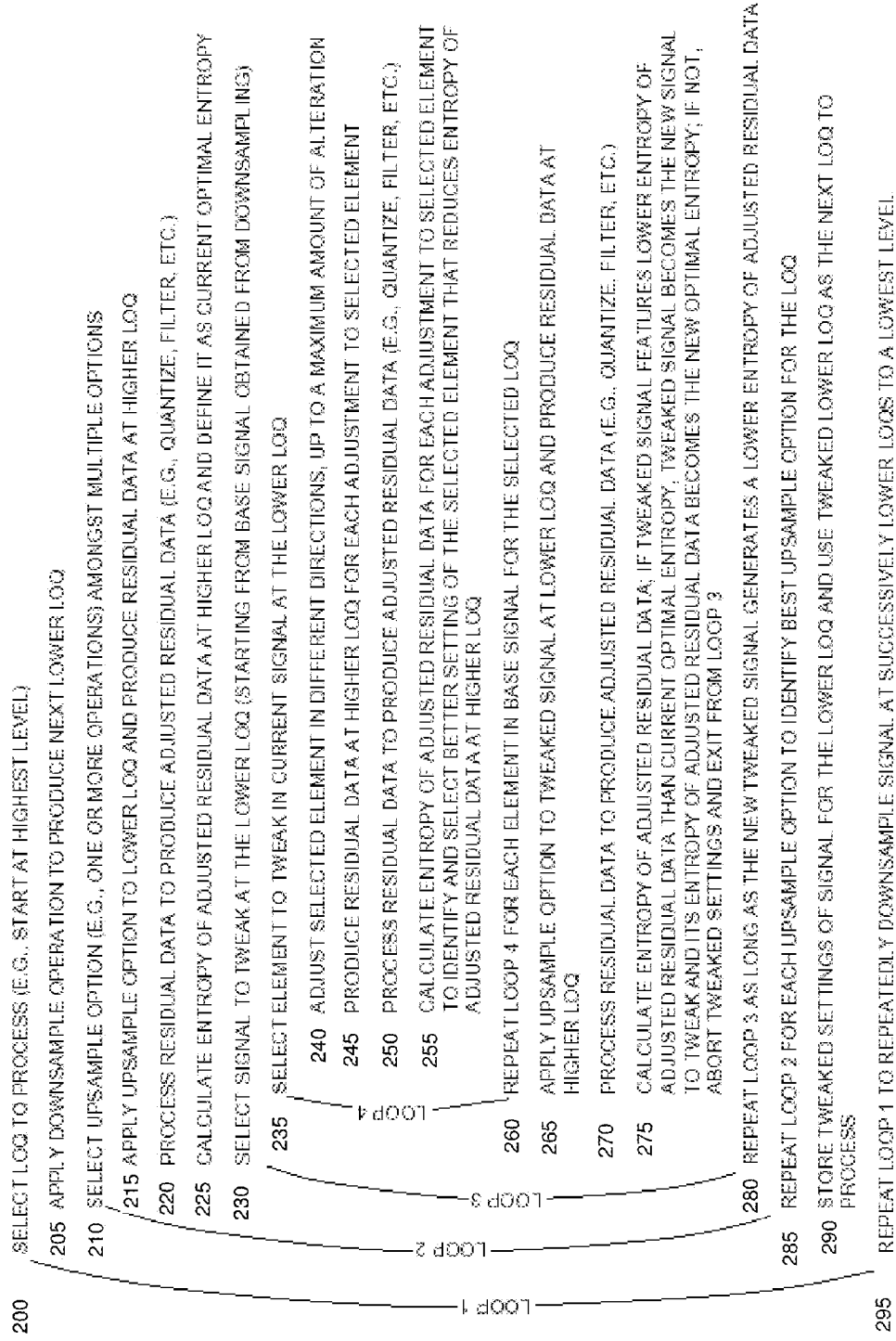
FIG. 2 is an example diagram illustrating steps of performing a downsampling algorithm according to embodiments herein.

FIG. 2 is an example diagram illustrating a downsampling method according to embodiments herein. Note that the discussion of the multi-loop algorithm in FIG. 2 will include references to the processing discussed in FIG. 1.

In step 200, the encoder 140 selects a level of quality to process. Assume in that this example that the encoder 140 selects and starts at level of quality J.

In step 205, the encoder 140 applies a selected downsample operation to produce signal data SJ-1.

In step 210, the encoder 140 selects an upsample option amongst multiple possible upsample options. Each upsample option may include upsampling via one or more upsample operations.

In step 215, the encoder 140 applies the selected upsample option to signal data SJ-1 to produce residual data 118-1.

In step 220, the encoder 140 applies a process (e.g., quantization or simulated quantization) to the residual data 118-1 to produce adjusted residual data 119-1.

In step 225, the encoder 140 calculates an entropy (or simulation/approximation thereof) of the adjusted residual data 119-1 and defines it as a current entropy value.

In step 230, the encoder 140 selects a signal (e.g., signal data SJ-1) to tweak at level of quality J-1.

In step 235, the encoder 140 selects an element to tweak in the selected signal data SJ-1 to produce signal data SJ-$1^T$.

In step 240, the encoder 140 adjusts the selected element in signal data SJ-$1^T$ in different directions and with potentially different amounts up to a maximum number of iterations.

In step 245, the encoder 140 produces residual data 118-1 (or at least a portion of it which is more directly influenced by the selected element) for each adjustment to the selected element.

In step 250, the encoder 140 processes the residual data 118-1 (or a portion thereof) to produce adjusted residual data 119-1 (or a portion thereof) for each tweak to the selected element as previously discussed.

In step 255, the encoder 140 calculates an entropy of the adjusted (portion of) residual data 119-1 for each tweak to the selected element to identify and select a substantially better or best setting of the selected element that reduces an entropy of the adjusted (portion of) residual data 119-1.

In step 260, the encoder 140 repeats loop 4 processing back to step 235 for each element in the selected signal data SJ-1 to identify a substantially best setting for each element in signal data SJ-1. The encoder 140 continues processing at step 260 subsequent to testing all elements.

In step 265, the encoder 140 applies an upsample operation to tweaked signal data SJ-$1^T$ and produces residual data 118-1 and adjusted residual data 119-1.

In step 270, the encoder 140 processes the residual data 118-1 to produce adjusted residual data 119-1.

In step 275, the encoder 140 calculates the entropy (or a simulation/approximation thereof) of the adjusted residual data 119-1. If the tweaked signal features lower entropy of adjusted residual data than current optimal entropy, the tweaked signal becomes the new signal to tweak and its entropy of adjusted residual data becomes the new optimal entropy. If not, the encoder 140 aborts tweaked settings and exits from loop 3 to step 285. Otherwise, the encoder 140 continues processing at step 280 to repeat loop 3.

In step 280, the encoder 140 continues execution at step 230 as long the new tweaked signal generates a lower entropy of adjusted residual data.

In step 285, the encoder 140 continues execution at step 210 for a next selected upsample option of multiple possible upsample options. When all upsample options have been tested, the encoder 140 continues processing at step 290.

In step 290, the encoder 140 stores tweaked settings for signal data SJ-$1^T$.

In step 295, the encoder 140 repeats processing at step 200 to downsample the signal data SJ-$1^T$ to a next lower level of quality J-2. The encoder 140 repeats this process until the signal 115 has been downsampled to a lowest desired level of quality.

Figure 3:
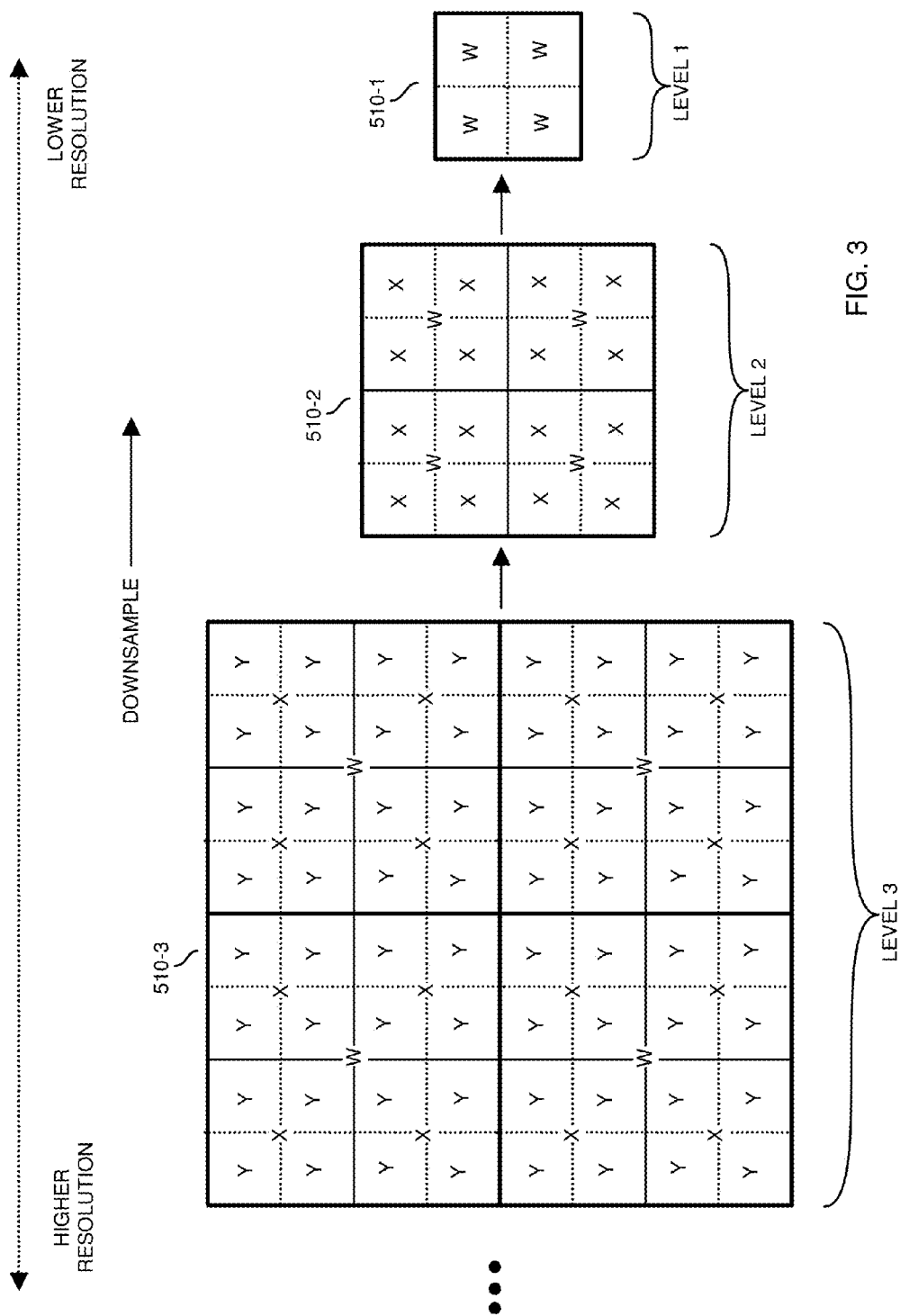
FIG. 3 is an example diagram illustrating downsampling of image information according to embodiments herein.

FIG. 3 is an example diagram illustrating downsampling of image information according to embodiments herein. As previously discussed, the signal 115 can represent image data. In accordance with such an embodiment, the signal data at each level of quality indicates settings of elements (e.g., pels/plane elements) in a respective image.

In one embodiment, each color component of an element in the signal data is encoded in accordance with a color space standard such as YUV, RGB or HSV, although the attributes of signal 115, when defining an image, can be encoded according to any suitable format.

Downsampling results in reducing a resolution and corresponding level of quality of respective signal data. For example, signal data for level of quality 3 indicates settings of elements in respective image 510-3; signal data for level of quality 2 indicates settings of elements in respective image 510-2; signal data for level of quality 1 indicates settings of elements in respective image 510-1, and so on.

When downsampling in a manner as previously discussed, the encoder 140 produces signal data for a next lower level of quality (e.g., level 2) to define, for example, image 510-2; the encoder 140 produces signal data for a next lower level of quality (e.g., level 1) to define, for example, image 510-1; and so on.

As previously discussed, the amount of data to define the downsampled image can be reduced for each lower level of quality to a desired lowest level of quality. That is, when executing a 2:1 scaled downsampling from level 3 to level 2, the encoder 140 reduces multiple elements Y in image 510-3 to a single element X in respective image 510-2 as shown. When downsampling from level 2 to level 1, the encoder 140 reduces multiple elements X in image 510-3 to a single element W in respective image 510-1, and so on.

Figure 4:
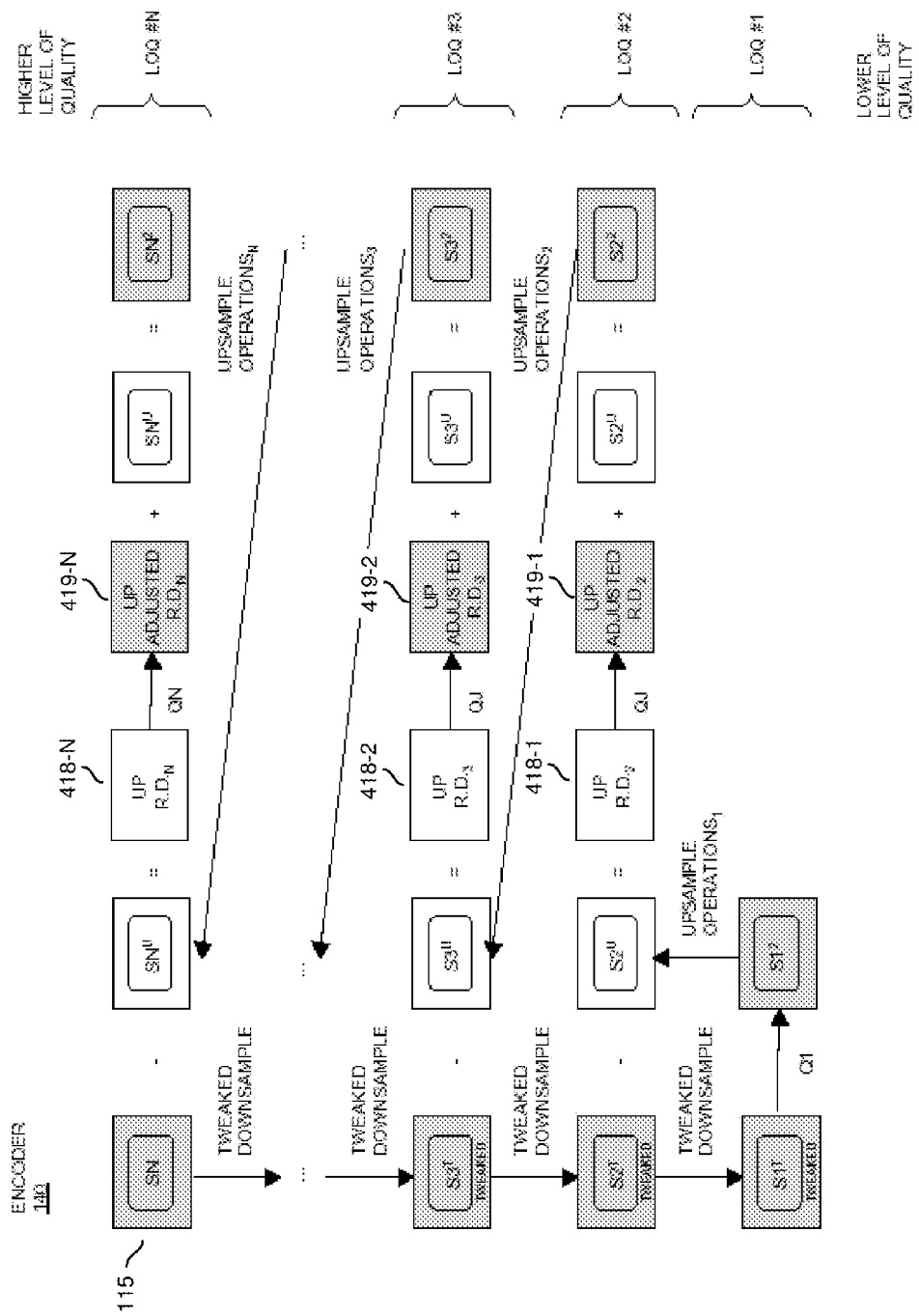
FIG. 4 is an example diagram illustrating encoding of a signal according to embodiments herein.

FIG. 4 is an example diagram illustrating further encoding of a signal according to embodiments herein.

In a manner as previously discussed, the encoder 140 downsamples signal 115 into different sets of signal data including signal data $S3^T$, signal data $S2^T$, signal data $S1^T$.

Note that that the process of tweaking during downsampling is optional. In accordance with other embodiments, any suitable downsample operation(s) can be applied by the encoder 140 to produce base sets of data in lieu of tweaked signal data such as signal data $S3^T$, signal data $S2^T$, $S1^T$.

At a lowest level of quality such as level of quality 1, the encoder 140 can be configured to apply quantization function Q1 to the signal data $S1^T$ to produce signal data $S1^2$. As previously discussed, quantization reduces an entropy of respective signal data.

Note that signal data $S1^2$ is reduced information representing the signal 115 at the lowest level of quality (e.g., level of quality #1) in the hierarchy.

The encoder 140 selects an upsample operation in which to upsample signal data $S1^2$ into signal data $S2^U$ (e.g., an intermediate rendition of the signal at the given level of quality). For the selected upsample operation, at level of quality 2, the encoder 140 produces residual data 418-1 based on a difference between signal data $S2^T$ and signal data $S2^U$. Because the encoding process may be lossy, the upsampled signal data $S2^U$ is likely similar to but not identical to signal data $S2^T$.

The encoder 140 then applies quantization function QJ to residual data 418-1 to produce adjusted residual data 419-1 in a manner as previously discussed. The encoder 140 can repeat this process for each of multiple different operations to determine which upsample operation or operations are best for reducing an entropy associated with adjusted residual data 419-1.

The encoder 140 then stores the signal data $S1^2$, substantially best identified upsample operation, and corresponding adjusted residual data 419-1 for level of quality #1. For this stored information, the encoder 140 adds the adjusted residual data 419-2 and signal data $S2^U$ to produce signal data $S2^2$.

Signal data $S2^2$ is a set of reduced information representing the signal at level of quality 2 in the hierarchy. Accordingly, embodiments herein include tweaking elements in the intermediate rendition of the signal (i.e., signal data $S2^U$) at the second level of quality to produce a tweaked rendition of the signal (e.g., signal data $S2^2$) at the second level of quality.

As will be discussed in FIG. 6, the encoder 140 generates residual data 470-2 based on a difference between an upsampled rendition of the signal 115 (e.g., signal data $S2^U$) at the second level of quality and the tweaked rendition of the signal (e.g., signal data $S2^3$) at the second level of quality; the encoder 140 generates residual data 470-3 based on a difference between an upsampled rendition of the signal 115 (e.g., signal data $S3^U$) at the second level of quality and the tweaked rendition of the signal (e.g., signal data $S3^3$) at the second level of quality; and so on.

Referring again to FIG. 4, the encoder 140 performs upsampling from level of quality 2 to level of quality 3 in a similar manner as discussed above for upsampling from level of quality 1 to level of quality 2. As an example, at level of quality 2, the encoder 140 selects an upsample operation (amongst multiple possible upsample operations) in which to upsample signal data $S2^2$ into signal data $S3^U$. For the selected upsample operation, at level of quality 3, the encoder 140 produces residual data 418-2 based on a difference between signal data $S3^T$ and signal data $S3^U$. Because the encoding process may be lossy, the upsampled signal data $S3^U$ is likely similar to but not identical to signal data $S3^T$.

The encoder 140 then applies quantization function QJ to residual data 418-2 to produce adjusted residual data 419-2 in a manner as previously discussed.

The encoder 140 can repeat this process for testing each of multiple different operations to determine which upsample operation or operations are best for reducing an entropy associated with adjusted residual data 419-2.

The encoder 140 then stores the signal data $S2^2$, respective best upsample operation, and corresponding adjusted residual data 419-2 for level of quality #2. The encoder 140 adds the adjusted residual data 419-2 and signal data $S3^U$ to produce signal data $S3^2$. Signal data $S3^3$ is a set of reduced information representing the signal at level of quality 3 in the hierarchy.

The encoder 140 repeats this process as shown up to level of quality N in the hierarchy.

Figure 5:
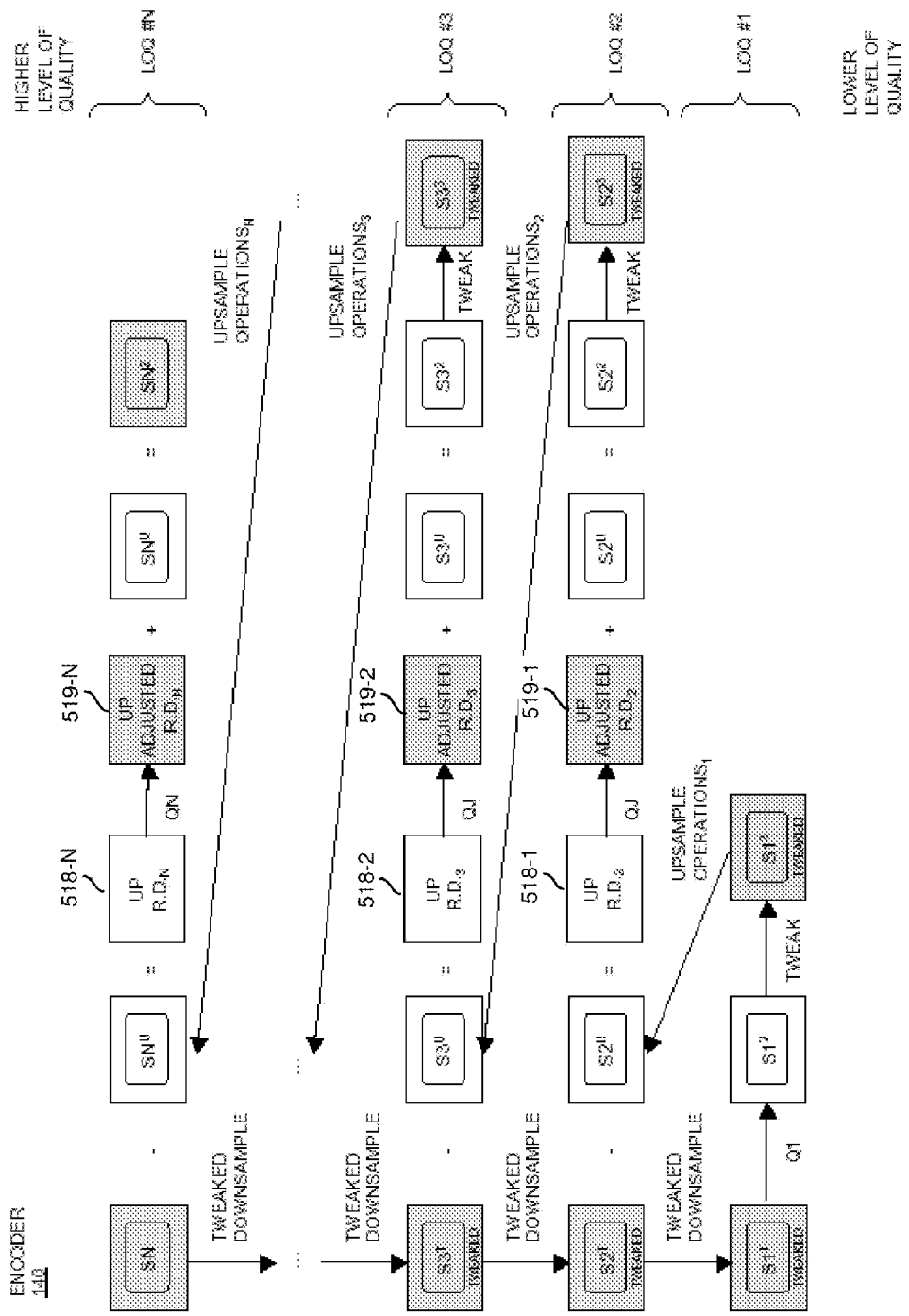
FIG. 5 is an example diagram illustrating encoding of a signal including tweaking of elements during upsampling to reduce an entropy of residual data according to embodiments herein.

FIG. 5 is an example diagram illustrating encoding of a signal including tweaking of elements during upsampling to reduce an entropy of residual data according to embodiments herein. In this example embodiment, unlike the example in FIG. 4, the encoder 140 performs tweaking of elements while upsampling to produce tweaked data for each level of quality.

In a manner as previously discussed, the encoder 140 downsamples signal 115 into any suitable sets of signal data representative of the signal 115 at lower levels of quality. Thus, downsampled signal data at lower levels may or may not be derived from tweaking during downsampling.

At a lowest level of quality such as level of quality 1, the encoder 140 applies quantization function Q1 to the downsampled signal data $S1^T$ to produce signal data $S1^2$. Signal data $S1^2$ is compressed or reduced information representing the signal at the lowest level of quality in the hierarchy. Application of quantization step Q1 to produce signal data $S1^2$ can be part of the downsampling process.

The encoder 140 then selects an upsample operation in which to upsample a tweaked version of signal data $S1^2$ (e.g., signal data $S1^3$) into signal data $S2^U$.

In this embodiment, the encoder 140 tweaks settings of signal data $S1^2$ to produce a set of signal data $S1^3$ that reduces an entropy associated with adjusted residual data 519-1. For example, in one embodiment, the encoder 140 selects an element in signal data $S1^2$ and repeatedly tweaks the selected element to identify which setting of the selected element produces a lowest entropy of adjusted residual data 519-1. The encoder 140 repeats the tweaking for each element in the signal data $S1^2$ to produce signal data $S1^3$.

Note that in addition to identifying a best setting for each element for the selected upsample operation, the encoder 140 can test each of multiple possible upsample operations to identify which operations and corresponding tweaks (for the different upsample operations) are best for producing the substantially lowest entropy associated with adjusted residual data 519-1.

Subsequent to identifying substantially best tweaked settings for signal data $S1^2$ and substantially best upsample operation, the encoder 140 then stores the tweaked signal data $S1^3$, best identified upsample operation, and corresponding adjusted residual data 519-1 for level of quality #1. For this stored information, the encoder 140 adds the adjusted residual data 519-1 and signal data $S2^U$ to produce signal data $S2^2$. Signal data $S2^2$ is a set of reduced information representing the signal at level of quality 2 in the hierarchy.

The encoder 140 then performs upsampling from level of quality 2 to level of quality 3 in a similar manner as discussed above for upsampling from level of quality 1 to level of quality 2. The encoder 140 repeats this process for each next higher level of quality until reaching the highest level of quality.

In one embodiment, the encoder 140 parses the downsampled rendition of the signal (e.g., signal data $S3^T$, signal data $S2^T$, signal data $S1^T$) at the first level of quality into multiple contiguous regions of image elements. The encoder then employs parallel processing units to simultaneously process the multiple regions to identify adjustments to elements in the multiple regions to reduce an entropy associated with the residual data.

In accordance with further embodiments, the encoder 140 can at least occasionally perform a so-called global check that selected adjustments to the elements in the individual contiguous regions that are processed in parallel do not substantially cause increased entropy of residual data for the overall signal data being processed.

Figure 6:
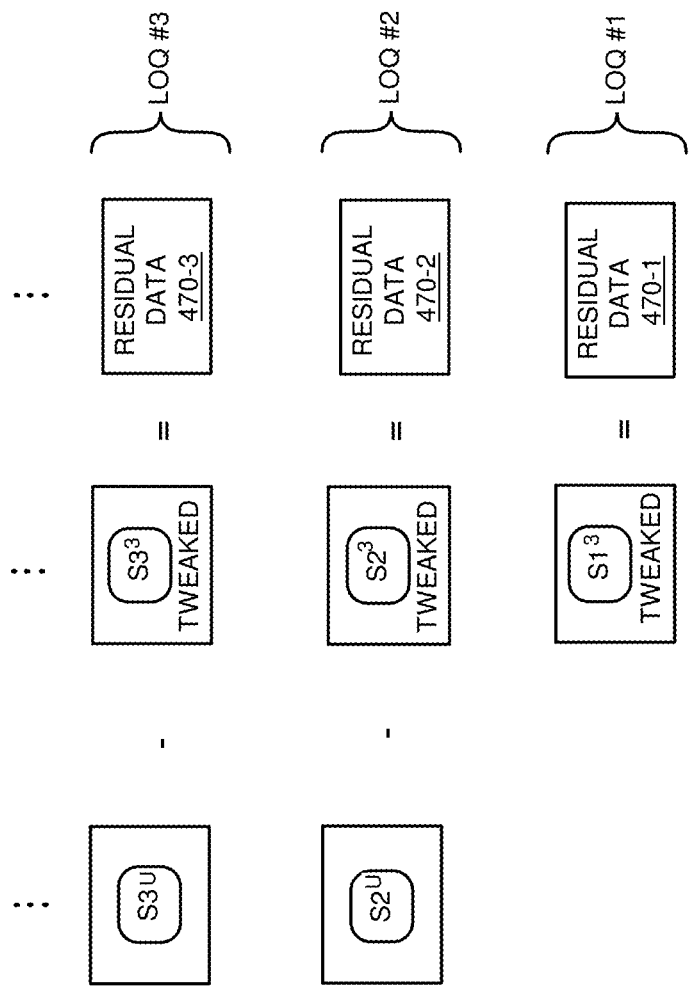
FIG. 6 is an example diagram illustrating generation of residual data for use by a decoder according to embodiments herein.

FIG. 6 is an example diagram illustrating generation of residual data for use by a decoder according to embodiments herein.

As shown, the encoder 140 stores signal data $S1^3$ as residual data 470-1. The encoder 140 sets residual data 470-2 equal to a difference between signal data $S2^U$ and signal data $S2^3$; the encoder 140 sets residual data 470-3 equal to a difference between signal data $S3^U$ and signal data $S3^3$; and so on. In general, residual data 470-2 indicates the adjustments that need to be made to signal data $S2^U$ in order to produce signal data $S2^3$; residual data 470-3 indicates the adjustments that need to be made to signal data $S3^U$ in order to produce signal data $S3^3$; and so on.

In one embodiment, a decoder uses residual data 470-1 to reconstruct $S1^3$ at lowest level of quality 1. At a next higher level (e.g., from level of quality 2 to level of quality 3), the decoder applies the selected upsample operation for the level of quality to convert signal data $S1^3$ into signal data $S2^U$; the decoder sums residual data 470-2 and signal data $S2^U$ to produce $S2^3$. At a next higher level (e.g., from level of quality 3 to level of quality 4), the decoder applies the selected upsample operation for the level of quality to convert signal data $S2^3$ into signal data $S3^U$; the decoder sums residual data 470-3 and signal data $S3^U$ to produce $S3^3$. The decoder repeats this process until it reconstructs the original 115 into a desired level of quality.

Figure 7:
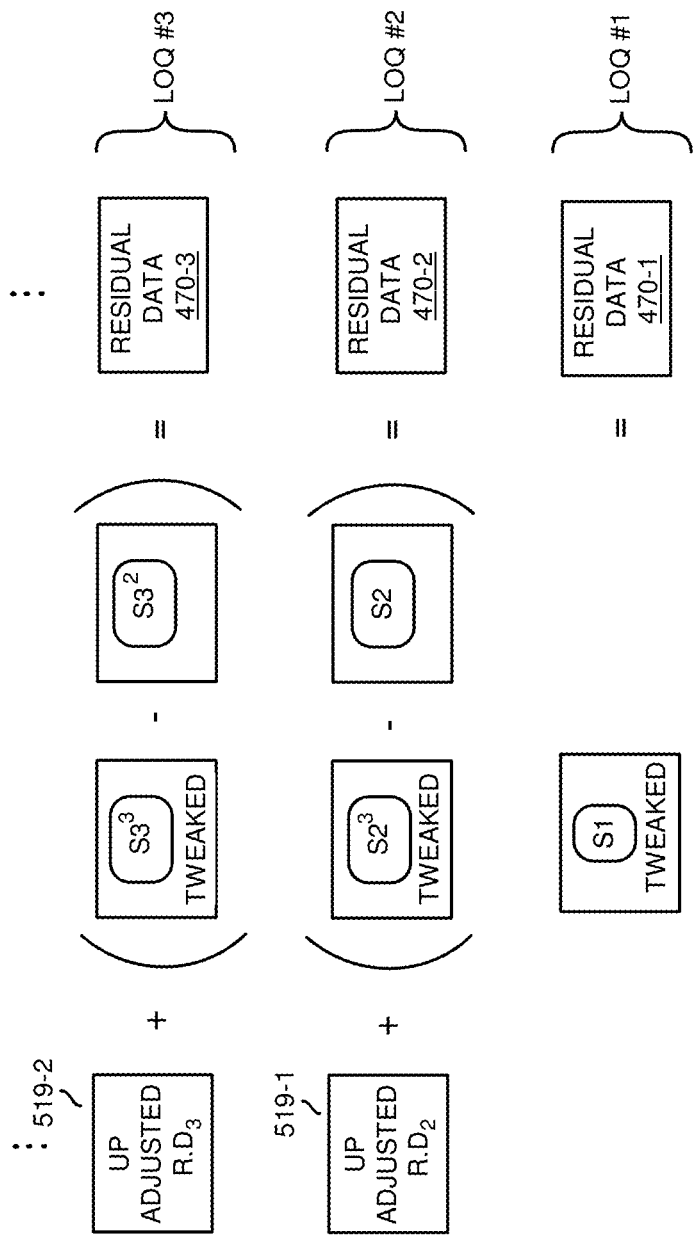
FIG. 7 is an example diagram illustrating generation of residual data according to embodiments herein.

FIG. 7 is an example diagram illustrating generation of residual data for use by a decoder according to embodiments herein. In this example embodiment, the encoder uses sets of adjusted residual data 519 to produce sets of residual data 470.

For example, the encoder 140 sets residual data 470-1 equal to signal data S1. The encoder 140 identifies a difference between signal data $S2^3$ and signal data $S2^2$ and adds the result to adjusted residual data 519-1 to produce residual data 470-2; the encoder 140 identifies a difference between signal data $S3^3$ and signal data $S3^2$ and adds the result to adjusted residual data 519-2 to produce residual data 470-3; and so on.

Note that the decoder uses the residual data 470 in a manner as discussed above to reconstruct the original 115 to a desired level of quality.

Figure 8:
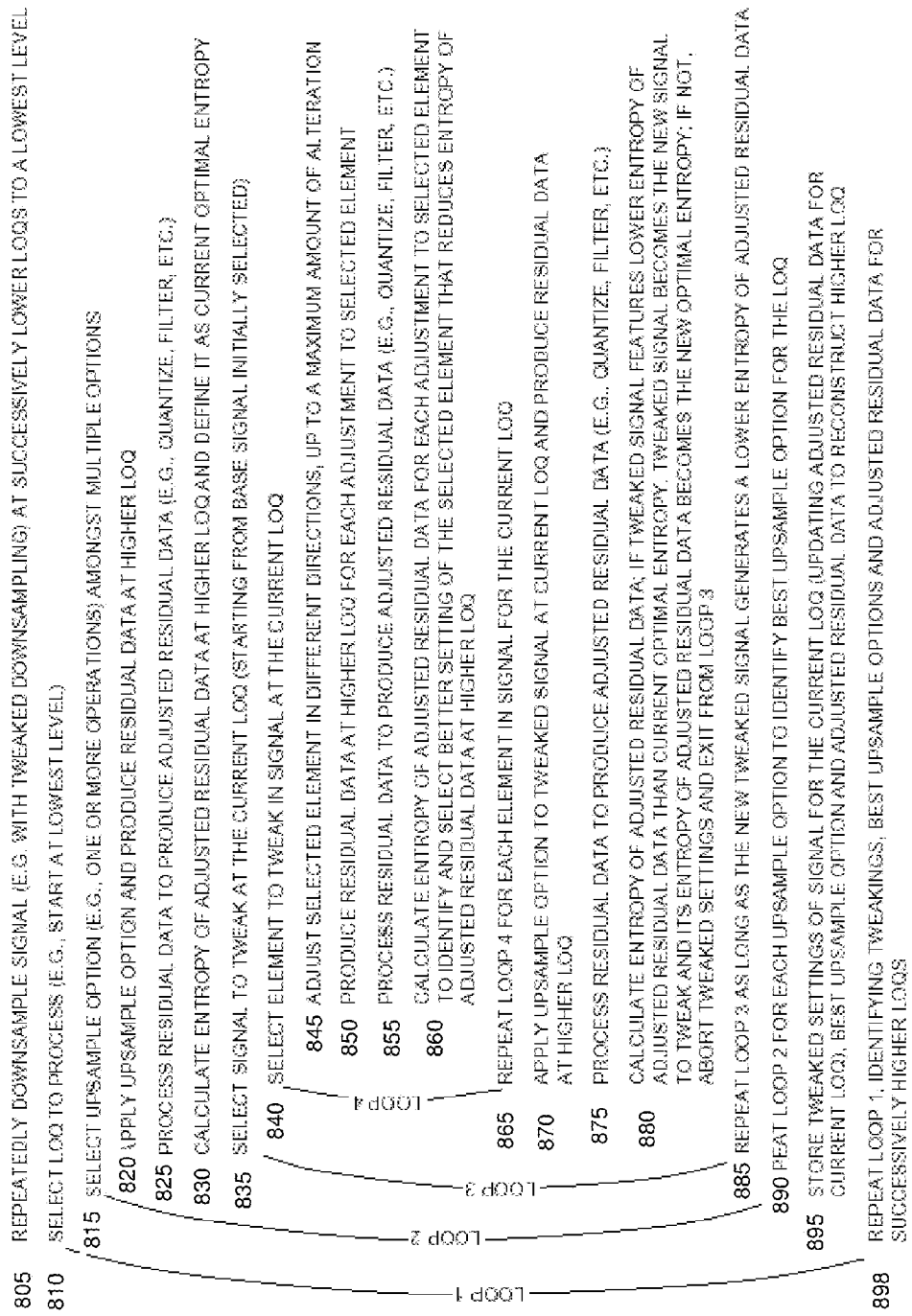
FIG. 8 is an example diagram illustrating generation of tweaking downsampled data according to embodiments herein.

FIG. 8 is an example diagram illustrating generation of tweaking downsampled data according to embodiments herein.

In step 805, the encoder 140 repeatedly downsamples the signal 115 at successively lower levels to a lowest level of quality. As previously discussed, the process can include application of any suitable downsampling function, which may or may not include tweaking each element as previously discussed.

In step 810, the encoder 140 selects a level of quality to process starting at the lowest level of quality.

In step 815, the encoder 140 selects an upsample option amongst multiple possible upsample options.

In step 820, the encoder 140 applies the selected upsample option to signal data at the selected level of quality to produce residual data at a next higher level of quality (e.g., a level above the selected level of quality).

In step 825, the encoder 140 applies a process (e.g., quantization function, filter function, etc.) to the residual data to produce adjusted residual data.

In step 830, the encoder 140 calculates and entropy of the adjusted residual data at the next higher level of quality and defines it as a current optimal entropy value.

In step 835, the encoder 140 selects a signal (e.g., signal $S1^2$) to tweak at the selected level of quality.

In step 840, the encoder 140 selects an element to tweak in the selected signal.

In step 845, the encoder 140 adjusts the selected element in different directions and amounts up to a maximum iteration value.

In step 850, the encoder 140 produces residual data and adjusted residual data for each adjustment to the selected element for the next higher level of quality.

In step 855, the encoder 140 processes the residual data to produce adjusted residual data 119-1 using a quantization function (or simulation/approximation thereof) as previously discussed.

In step 860, the encoder 140 calculates an entropy of the adjusted residual data at the next higher level of quality for each tweak to the selected element to identify and select a better or substantially best setting of the selected element that reduces an entropy of the adjusted residual data.

In step 865, the encoder 140 repeats loop 4 (e.g., continues execution back to step 840) for each element in the selected signal data. The encoder 140 continues processing at step 870 subsequent to testing and tweaking all elements.

In step 870, the encoder 140 applies an upsample operation to tweaked signal data at the selected level of quality and produces residual data at the next higher level of quality.

In step 875, the encoder 140 processes (e.g., by quantization or a suitable simulation/approximation thereof) the residual data at the next higher level of quality to produce respective adjusted residual data.

In step 880, the encoder 140 calculates the entropy of the adjusted residual data. If the tweaked signal features lower entropy of adjusted residual data than current optimal entropy for the selected signal, the tweaked signal becomes the new signal to tweak and its entropy of adjusted residual data becomes the new optimal entropy. If not, the encoder 140 aborts tweaked settings and exits from loop 3 to step 890. Otherwise, the encoder 140 continues processing at step 885.

In step 885, the encoder 140 continues execution at step 835 for the newly selected signal as long the new tweaked signal generates a lower entropy of adjusted residual data.

In step 890, the encoder 140 continues execution at step 210 for a next selected upsample option of multiple possible upsample options. When all upsample options have been tested, the encoder 140 continues processing at step 895.

In step 895, the encoder 140 stores tweaked settings for the selected level of quality by updating the adjusted residual data for the current level of quality, storing the best upsample option, and corresponding adjusted residual data.

In step 898, the encoder 140 repeats processing at step 810 to identify best tweakings, best upsample operation and adjusted residual data for each successively higher level of quality in the hierarchy.

Figure 9:
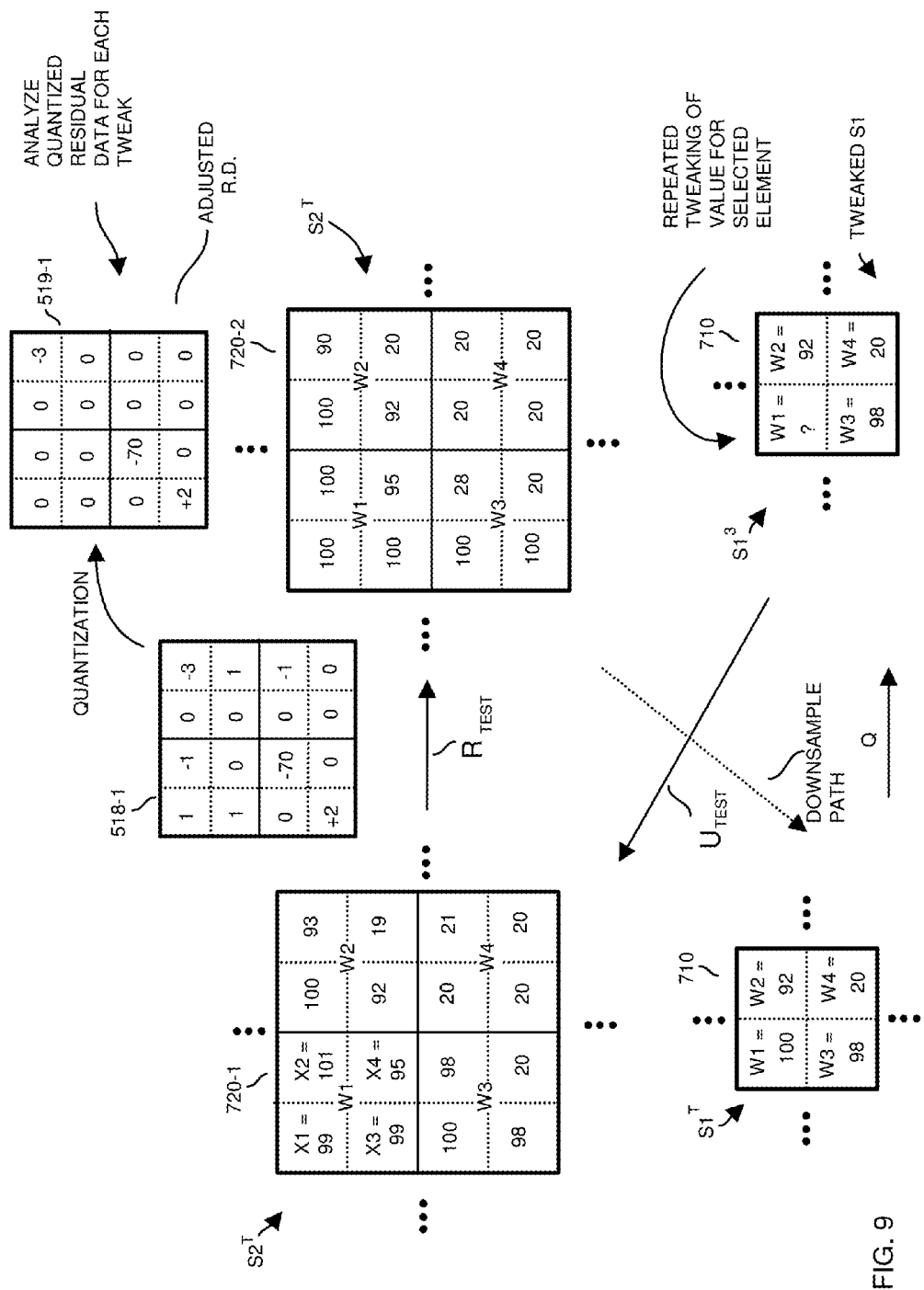
FIG. 9 is a diagram illustrating an example method of downsampling, tweaking, upsampling, and quantizing residual data according to embodiments herein.

FIG. 9 is a diagram illustrating an example method of processing a received signal according to embodiments herein.

During a downsampling process as shown, the encoder 140 initiates downsampling of signal data $S2^T$ into signal data $S1^T$ at a next lower level of quality in the hierarchy.

Subsequent to completion of downsampling, the encoder 140 performs upsampling at a lowest level. In accordance with such an embodiment, the encoder 140 selects an element (e.g., W1) to tweak. For each tweak to the selected element W1, the encoder 140 upsamples the tweaked signal data $S1^3$ to produce signal data $S2^U$.

In this example, upsampling using $U_{TEST}$ causes the element W1 to be expanded into element and respective values X1=99, X2=101, X3=99, and X4=95. The encoder 140 then produces residual data 518-1 and adjusted residual data 519-1 in a manner as previously discussed. The quantization of residual data 518-1 can include setting near zero values in the residual data 518-1 to zero values in the adjusted residual data 519-1.

That is, element set to values +1 or −1 in residual data 518-1 are set to a value of 0 to produce the adjusted residual data 519-1.

Note that a range or threshold value for implementing quantization can vary at different levels in the hierarchy. For example, a smaller range or lower threshold value may be used at the lower levels of quality to preserve a quality of the image at the higher levels of quality. In other words, it may be desired to generate more residual data at the lower levels to prevent a need for generating much more residual data at a higher level.

Figure 10:
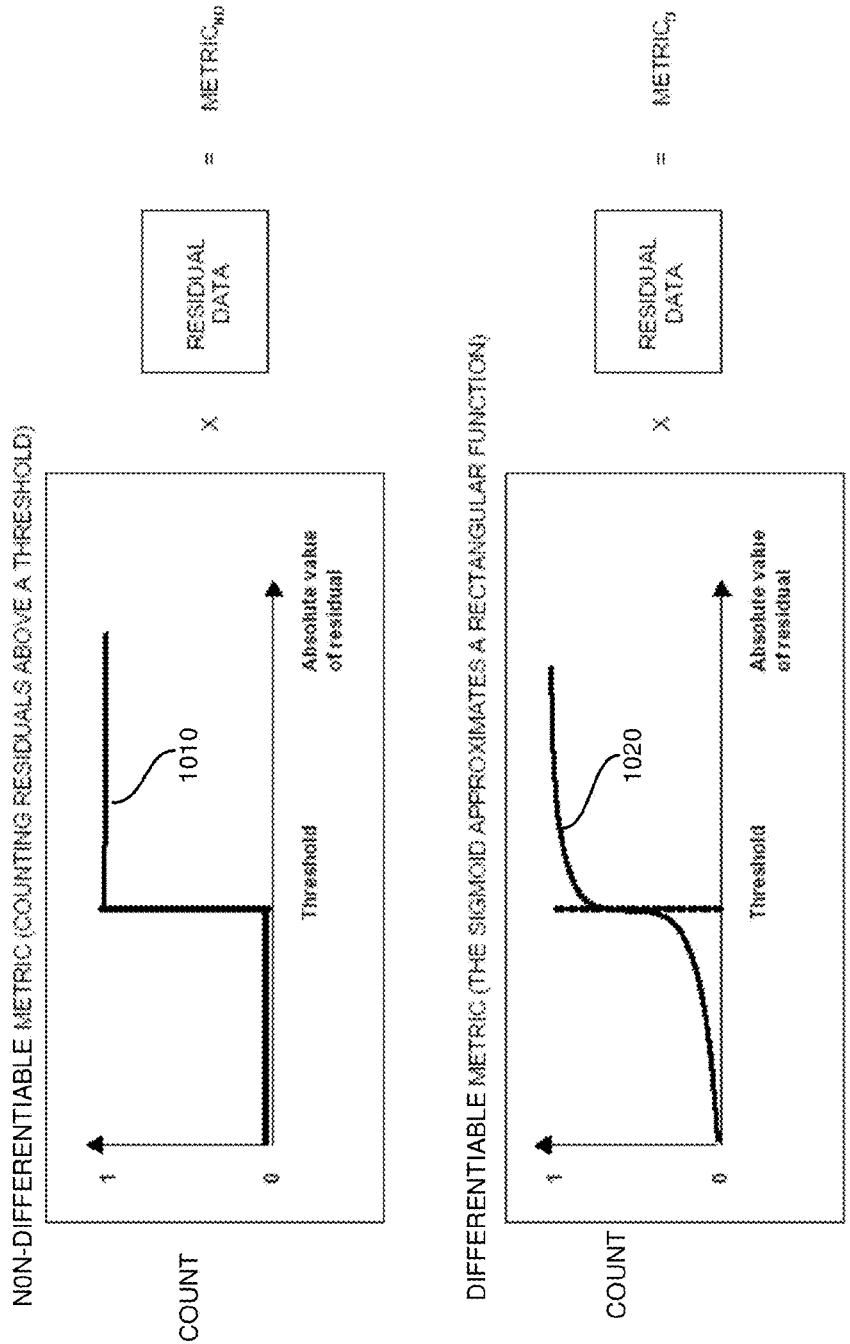
FIG. 10 is a diagram illustrating an example of function for determining entropy according to embodiments herein.

FIG. 10 is a diagram illustrating an example of producing entropy values according to embodiments herein.

One embodiment herein includes utilizing a suitable metric that can quickly determine whether an alteration (e.g., tweak) improves or worsens the entropy of respective residuals. As previously discussed, entropy of residual data can be a measure of how much information is necessary to transmit residuals, where residual data includes symbols or numbers.

Entropy at a basic level depends on how many different symbols are encoded in the residual data. The higher the number of different symbols in the residual data, the higher the entropy. Large drops of entropy can be achieved when there is mainly only one symbol that is much more likely than all the others. When that is the case, it is almost irrelevant whether all of the other symbols are just one symbol or many other symbols.

One method of calculating an entropy value for residual data is to count a number of values in the residual data that are greater than a threshold value or fall within a particular range. The entropy value produced in this manner (e.g., using a rectangular step function) is mathematically non-differentiable. That is, as specified in FIG. 10, the step function 1010 is a rectangular function having an infinite slope at the threshold value.

In accordance with another embodiment, the encoder 140 can be configured to implement a continuous function 1020 (e.g., a differentiable function) that simulates a substantially rectangular function (e.g., step function 1010). The continuous function 1020 facilitates quantification of entropy associated with the residual data based on use of derivatives.

For example, one embodiment herein includes utilizing a sigmoid function to simulate the rectangular function. In accordance with such an embodiment, the encoder 140 maps each element value in the residual data to a respective count value (e.g., decimal value) based on the function 1020 instead of step function 1010. In the previous example, the encoder 140 maps each to a value of one or zero depending on whether the element value was above or below the threshold. In contrast, when using the function 1020, the encoder 140 maps a respective element to a non-integer value (e.g., decimal value) greater than zero and less than one.

For a given tweaking, when using the function 1020, the encoder 140 produces an entropy value by summing the respective decimal count values produced for each of the elements. The encoder 140 repeats this process using the function 1020 for each tweaking. Based on the entropy values for the tweakings of a given element, the encoder 140 produces the function in FIG. 11 indicating how entropy of the residual data changes based on tweaking of a respective element.

Figure 11:
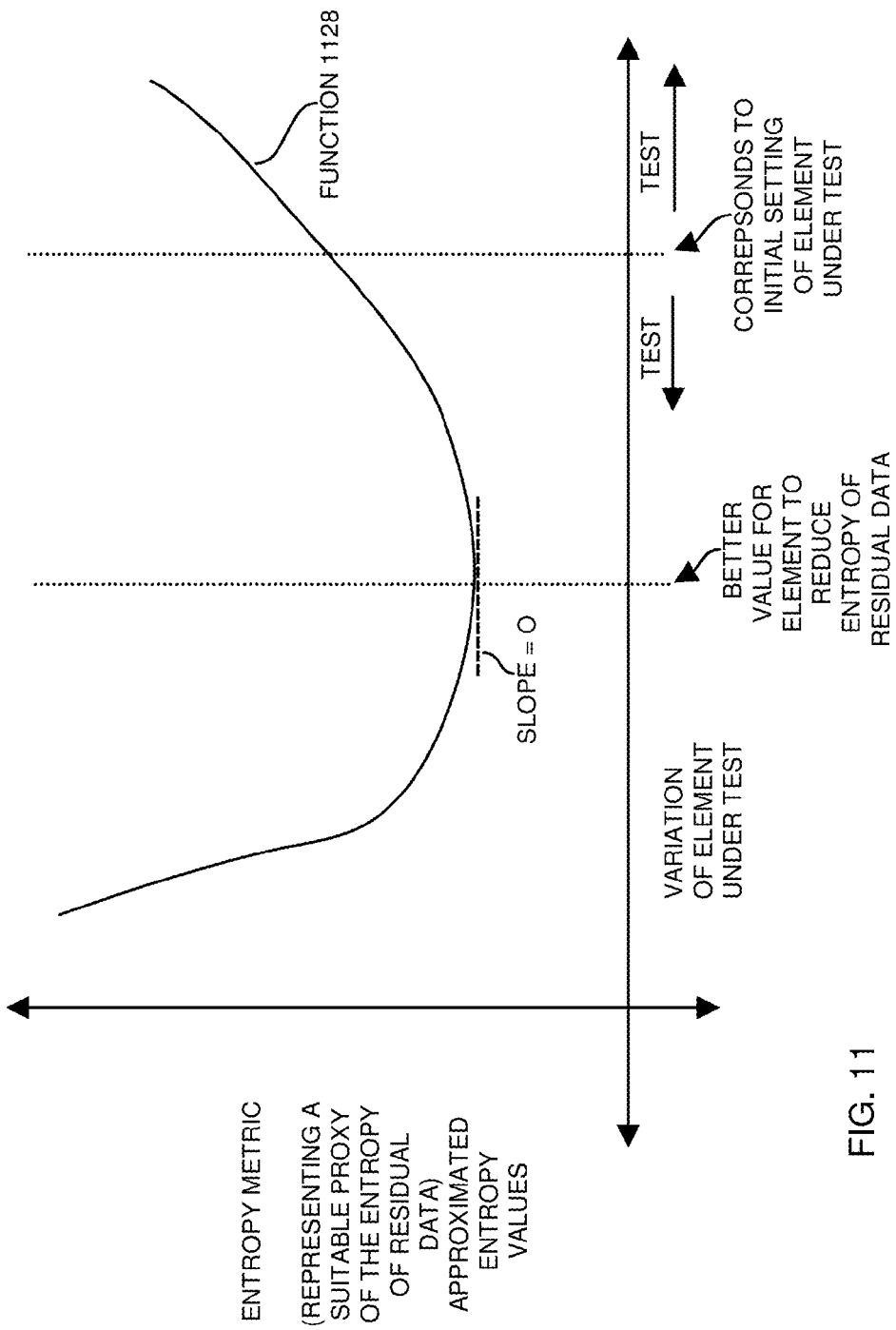
FIG. 11 is a diagram illustrating an example of quantizing residual data according to embodiments herein.

The function 1128 in FIG. 11 is a differentiable function. That is, producing a derivative of the function 1128 enables the encoder 140 to identify where the slope of the function 1128 is approximately zero. This point (where slope is substantially equal to zero) in the function 1128 indicates a setting of the respective element that produces the lowest entropy for residual data.

Accordingly, embodiments herein include generating an entropy function 1128 in which a magnitude of the entropy function varies depending on different possible adjustments to the selected element under test in the downsampled signal and then utilizing the entropy function 1128 to identify an adjustment to the element in the downsampled signal in which a respective entropy of the residual data for the adjustment is substantially minimal amongst different possible variations of the element under test. The horizontal axis of the graph in FIG. 11 indicates the different possible variations of the element under test while the vertical axis indicates the relative entropy of respective residual data for the settings.

Figure 12:
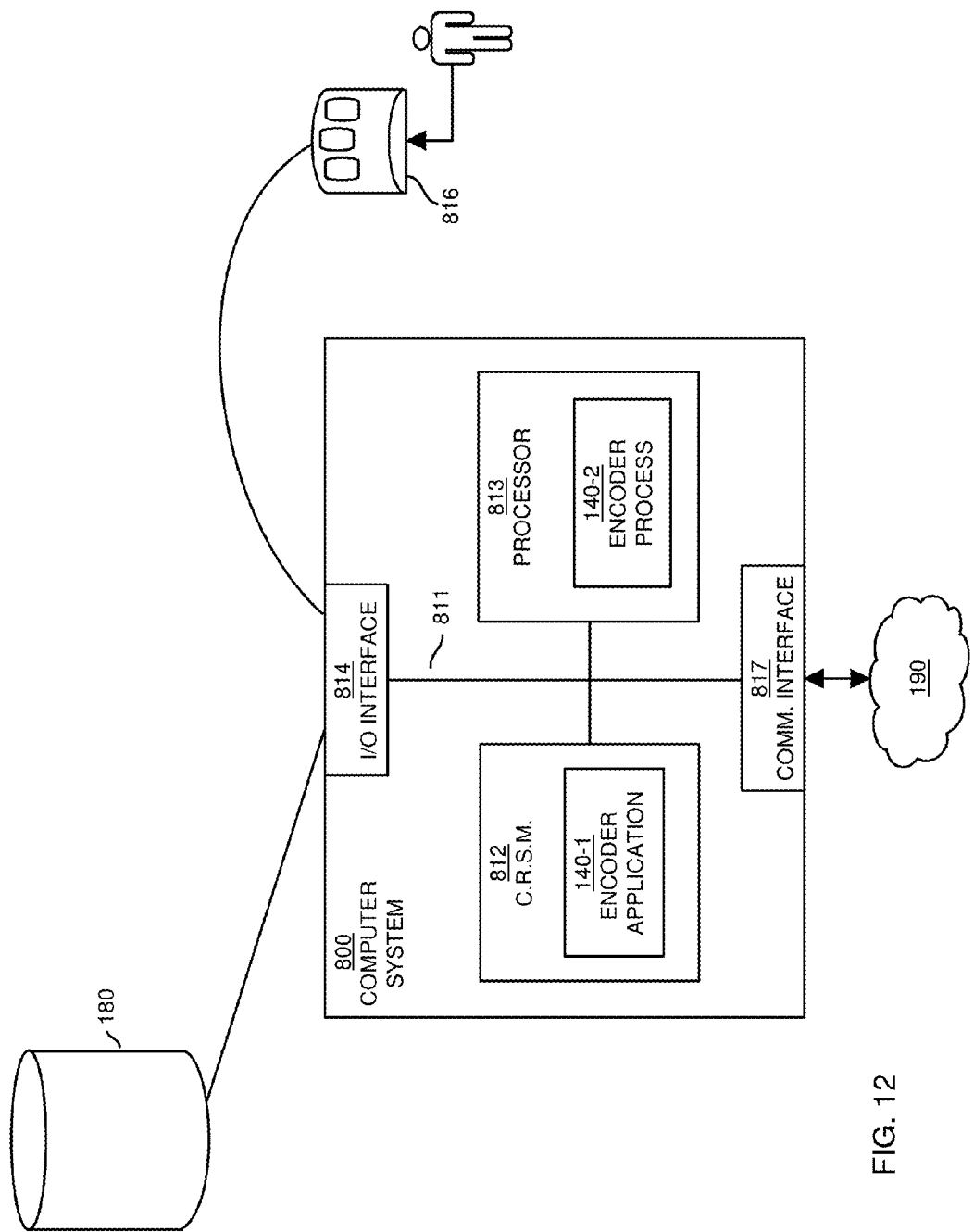
FIG. 12 is a diagram illustrating an example computer architecture for executing computer code, firmware, software, applications, logic, etc., according to embodiments herein.

FIG. 12 is an example block diagram of a computer system 800 that provides computer processing according to embodiments herein.

Computer system 800 can be or include a computerized device such as a personal computer, processing circuitry, workstation, portable computing device, console, network terminal, processing device, network device, operating as a switch, router, server, client, etc.

Note that the following discussion provides a basic embodiment indicating how to carry out functionality associated with encoder 140 as previously discussed. However, it should be noted that the actual configuration for carrying out the operations as described herein can vary depending on a respective application.

As shown, computer system 800 of the present example includes an interconnect 811 that couples computer readable storage media 812 such as a non-transitory type of media, computer readable, hardware storage medium, etc., in which digital information can be stored and retrieved. Computer system 800 can further include a processor 813, I/O interface 814, and a communications interface 817.

I/O interface 814 provides connectivity to repository 180, and if present, display screen, peripheral devices 816 such as a keyboard, a computer mouse, etc.

Computer readable storage medium 812 (e.g., a hardware storage media) can be any suitable device and/or hardware such as memory, optical storage, hard drive, floppy disk, etc. The computer readable storage medium can be a non-transitory storage media to store instructions associated with encoder 140-1. The instructions are executed by a respective resource such as encoder 140 to perform any of the operations as discussed herein.

Communications interface 817 enables computer system 800 to communicate over network 190 to retrieve information from remote sources and communicate with other computers, switches, clients, servers, etc. I/O interface 814 also enables processor 813 to retrieve or attempt retrieval of stored information from repository 180.

As shown, computer readable storage media 812 can be encoded with encoder application 140-1 executed by processor 813 as encoder process 140-2.

Note that the computer system 800 or encoder 140 also can be embodied to include a computer readable storage medium 812 (e.g., a hardware storage media, non-transitory storage media, etc.) for storing data and/or logic instructions.

Computer system 800 can include a processor 813 to execute such instructions and carry out operations as discussed herein. Accordingly, when executed, the code associated with encoder application 140-1 can support processing functionality as discussed herein.

During operation of one embodiment, processor 813 accesses computer readable storage media 812 via the use of interconnect 811 in order to launch, run, execute, interpret or otherwise perform the instructions of encoder application 140-1 stored in computer readable storage medium 812. Execution of the encoder application 140-1 produces processing functionality in processor 813. In other words, the encoder process 140-2 associated with processor 813 represents one or more aspects of executing encoder application 140-1 within or upon the processor 813 in the computer system 800.

Those skilled in the art will understand that the computer system 800 can include other processes and/or software and hardware components, such as an operating system that controls allocation and use of hardware processing resources to execute encoder application 140-1.

In accordance with different embodiments, note that computer system may be any of various types of devices, including, but not limited to, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Note again that techniques herein are well suited for use in processing and reconstructing signals using a decoder. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method of encoding at different levels of quality in a hierarchy, the method comprising:

having a signal as input;

utilizing at least one downsample operation to produce downsampled renditions of the signal at successively lower levels of quality in the hierarchy;

applying at least one upsample operation to a downsampled rendition of the signal at a first level of quality to produce an upsampled rendition of the signal at a second level of quality in the hierarchy, the second level of quality being higher than the first level of quality; and producing residual data indicating a difference between the downsampled rendition of the signal at the second level of quality and the upsampled rendition of the signal at the second level of quality, the method further comprising:

parsing the downsampled rendition of the signal at the first level of quality into multiple regions of elements; and simultaneously processing the multiple regions in parallel to identify adjustments to elements in the multiple regions to locally reduce an entropy associated with the residual data.

2. The method as in claim 1, wherein the at least one downsample operation is non-linear.

3. The method as in claim 2, wherein the at least one upsample operation is non-linear.

4. The method as in claim 1 further comprising:
at least occasionally performing a global check of adjustments to the elements in the multiple regions to reduce an entropy of the residual data.

5. The method as in claim 1 further comprising, wherein applying the at least one upsample operation includes:
for each of multiple elements in the rendition of the signal at the first level of quality, repeating steps of:
selecting an element to tweak in the downsampled signal at the first level of quality;
tweaking the selected element in different directions;
producing the residual data at the second level of quality based on the tweaked selected element; and
calculating an entropy of the residual data at the second level of quality to identify which tweak to the selected element at the first level of quality produces a set of residual data at the second level of quality having the substantially lowest entropy.

6. The method as in claim 5, wherein calculating the entropy includes quantization of the residual data to reduce the entropy.

7. The method as in claim 5, wherein applying the at least one upsample operation further comprises applying multiple upsample operations to the downsampled rendition of the signal at the first level of quality; and
wherein producing the residual data includes identifying which of multiple upsample options applied to the downsampled rendition of the signal at the first level of quality produces residual data having the substantially lowest entropy.

8. The method as in claim 1, wherein applying the at least one upsample operation further comprises:
applying multiple upsample operations to the downsampled rendition of the signal at the first level of quality; and
wherein producing the residual data includes identifying which of multiple upsample options applied to the downsampled rendition of the signal at the first level of quality produces residual data having the substantially lowest entropy.

9. The method as in claim 1, wherein utilizing the at least one downsample operation to produce downsampled renditions of the signal at successively lower levels of quality in the hierarchy further comprises:
for each of multiple successively lower levels of quality in the hierarchy, repeating steps of:
downsampling the signal;
selecting an element to tweak in the downsampled signal at a selected level of quality;
tweaking the selected element in different directions to produce the residual data; and
calculating an entropy of the residual data to identify which tweak to the selected element produces a set of residual data having the substantially lowest entropy.

10. The method as in claim 1, wherein the at least one upsample operation is non-linear.

11. The method as in claim 1, wherein the signal is an image.

12. The method as in claim 1, wherein the signal is a video signal.

13. The method as in claim 1, wherein the signal is an audio signal.

14. The method as in claim 1, wherein the signal is a volumetric signal.

15. A method of encoding at different levels of quality in a hierarchy, the method comprising:
having a signal as input;
utilizing at least one downsample operation to produce downsampled renditions of the signal at successively lower levels of quality in the hierarchy;
applying at least one upsample operation to a downsampled rendition of the signal at a first level of quality to produce an upsampled rendition of the signal at a second level of quality in the hierarchy, the second level of quality being higher than the first level of quality;
producing residual data indicating a difference between the downsampled rendition of the signal at the second level of quality and the upsampled rendition of the signal at the second level of quality; and
adjusting settings of elements in the downsampled rendition of the signal at the first level of quality to reduce an entropy of the residual data needed to reconstruct a rendition of the signal at the second level of quality.

16. A method of encoding at different levels of quality in a hierarchy, the method comprising:
having a signal as input;
utilizing at least one downsample operation to produce downsampled renditions of the signal at successively lower levels of quality in the hierarchy;
applying at least one upsample operation to a downsampled rendition of the signal at a first level of quality to produce an upsampled rendition of the signal at a second level of quality in the hierarchy, the second level of quality being higher than the first level of quality;
producing residual data indicating a difference between the downsampled rendition of the signal at the second level of quality and the upsampled rendition of the signal at the second level of quality;
for each of multiple upsample options used to upsample the rendition of the signal at the first level of quality into the rendition of the signal at the second level of quality, adjusting settings of elements in the downsampled rendition of the signal at the first level of quality to reduce an entropy of the residual data needed to reconstruct a rendition of the signal at the second level of quality; and
identifying which of the multiple upsample options and adjustments to the downsampled rendition of the signal at the first level of quality results in the substantially lowest entropy for the residual data.

17. A method of encoding at different levels of quality in a hierarchy, the method comprising:
having a signal as input;
utilizing at least one downsample operation to produce downsampled renditions of the signal at successively lower levels of quality in the hierarchy;
applying at least one upsample operation to a downsampled rendition of the signal at a first level of quality to produce an upsampled rendition of the signal at a second level of quality in the hierarchy, the second level of quality being higher than the first level of quality;
producing residual data indicating a difference between the downsampled rendition of the signal at the second level of quality and the upsampled rendition of the signal at the second level of quality;
implementing a continuous transform function to simulate a substantially rectangular function, the continuous transform function facilitating quantification of entropy associated with the residual data;
wherein the continuous transform function is a sigmoid function; and wherein implementing the continuous transform function to simulate the substantially rectangular function further comprises: generating an entropy function, a magnitude of the entropy function varying depending on different possible adjustments to the downsampled signal at the first level of quality; and utilizing the entropy function to identify an adjustment to the downsampled signal at the first level of quality in which a respective entropy of the residual data for the adjustment is substantially minimal amongst the different possible adjustments.

18. A method of encoding at different levels of quality in a hierarchy, the method comprising:
    having a signal as input;
    utilizing at least one downsample operation to produce downsampled renditions of the signal at successively lower levels of quality in the hierarchy;
    applying at least one upsample operation to a downsampled rendition of the signal at a first level of quality to produce an upsampled rendition of the signal at a second level of quality in the hierarchy, the second level of quality being higher than the first level of quality;
    producing residual data indicating a difference between the downsampled rendition of the signal at the second level of quality and the upsampled rendition of the signal at the second level of quality;
    repeatedly adjusting settings of elements in the downsampled rendition of the signal at the first level of quality to produce a tweaked rendition of the signal at the first level of quality;
    upsampling the tweaked rendition of the signal at the first level of quality to produce the upsampled rendition of the signal at the second level of quality;
    applying the residual data to the upsampled rendition of the signal at the second level of quality to produce an intermediate rendition of the signal at the second level of quality;
    tweaking elements in the intermediate rendition of the signal at the second level of quality to produce a tweaked rendition of the signal at the second level of quality; and
    generating a second set of residual data based on a difference between the upsampled rendition of the signal at the second level of quality and the tweaked rendition of the signal at the second level of quality.

19. A method of encoding at different levels of quality in a hierarchy, the method comprising:
    having a signal as input;
    utilizing at least one downsample operation to produce downsampled renditions of the signal at successively lower levels of quality in the hierarchy;
    applying at least one upsample operation to a downsampled rendition of the signal at a first level of quality to produce an upsampled rendition of the signal at a second level of quality in the hierarchy, the second level of quality being higher than the first level of quality;
    producing residual data indicating a difference between the downsampled rendition of the signal at the second level of quality and the upsampled rendition of the signal at the second level of quality; and
    wherein utilizing the at least one downsample operation to produce the downsampled renditions of the signal at successively lower levels of quality further comprises:
    selecting a level of quality J in which to downsample the signal, the level of quality J representing a highest level of quality in the hierarchy;
    applying a selected downsampling operation to the signal at the level of quality J into a rendition of the signal at a level of quality J-1, the level of quality J-1 being a next lower level of quality beneath the level of quality J;
    tweaking settings of values in the rendition of the signal at level of quality J-1 to identify a tweaked rendition of the signal at the level of quality J-1 that reduces an entropy of residual data needed to reconstruct the signal at level of quality J.

20. The method as in claim 19 further comprising:
    applying a selected downsampling operation to the tweaked rendition of the signal at the level of quality J-1 into a rendition of the signal at a level of quality J-2, the level of quality J-2 being a next lower level of quality beneath the level of quality J-1;
    tweaking settings of values in the rendition of the signal at level of quality J-2 to identify a tweaked rendition of the signal at the level of quality J-2 that reduce an entropy of residual data needed to reconstruct the tweaked rendition of the signal at level of quality J-1; and
    repeating steps of applying a selected downsampling operation and tweaking settings in the hierarchy at pairs of successively lower levels of quality to produce the downsampled rendition of the signal at the second level of quality and the first level of quality.

21. The method as in claim 19 further comprising:
    repeatedly testing which of multiple possible upsample operations and tweaked settings of values in the rendition of the signal at level of quality J-1 reduces an entropy of residual data needed to reconstruct the signal at level of quality J.

22. Computer-readable storage hardware having instructions stored thereon, the instructions, when carried out by a processing device, causing the processing device to perform operations of:
    receiving a signal;
    utilizing at least one downsample operation to produce downsampled renditions of the signal at successively lower levels of quality in the hierarchy;
    applying at least one upsample operation to a downsampled rendition of the signal at a first level of quality to produce an upsampled rendition of the signal at a second level of quality in the hierarchy, the second level of quality being higher than the first level of quality; and
    producing residual data indicating a difference between the downsampled rendition of the signal at the second level of quality and the upsampled rendition of the signal at the second level of quality;
    parsing the downsampled rendition of the signal at the first level of quality into multiple regions of elements; and
    simultaneously processing the multiple regions in parallel to identify adjustments to elements in the multiple regions to locally reduce an entropy associated with the residual data.

23. A computer system comprising:
    a processor;
    a memory unit that stores instructions associated with an application executed by the processor; and
    an interconnect coupling the processor and the memory unit, causing the computer system to execute the application and perform operations of:
        having a signal as input;
        utilizing at least one downsample operation to produce downsampled renditions of the signal at successively lower levels of quality in the hierarchy;
        applying at least one upsample operation to a downsampled rendition of the signal at a first level of quality to produce an upsampled rendition of the signal at a second level of quality in the hierarchy, the second level of quality being higher than the first level of quality; and producing residual data indicating a difference between the downsampled rendition of the signal at the second level of quality and the upsampled rendition of the signal at the second level of quality;

wherein applying the at least one upsample operation further comprises: applying multiple upsample operations to the downsampled rendition of the signal at the first level of quality; and wherein producing the residual data includes identifying which of multiple upsample options applied to the downsampled rendition of the signal at the first level of quality produces residual data having the substantially lowest entropy.

24. The computer system as in claim 23, wherein either the at least one downsample operation is non-linear.

25. The computer system as in claim 23, wherein the computer system executes the application and further performs operations of:

adjusting settings of elements in the downsampled rendition of the signal at the first level of quality to reduce an entropy of the residual data needed to reconstruct the downsampled rendition of the signal at the second level of quality.

26. The computer system as in claim 23, wherein the computer system executes the application and further performs operations of:

for each of multiple upsample options used to upsample the rendition of the signal at the first level of quality into the rendition of the signal at the second level of quality, adjusting settings of elements in the downsampled rendition of the signal at the first level of quality to reduce an entropy of the residual data needed to reconstruct the downsampled rendition of the signal at the second level of quality; and identifying which of the multiple upsample options and tweaks to the downsampled rendition of the signal at the first level of quality results in the substantially lowest entropy for the residual data.

27. The computer system as in claim 23, wherein the computer system executes the application and further performs operations of:

parsing the downsampled rendition of the signal at the first level of quality into multiple regions of elements; and simultaneously processing the multiple regions in parallel to identify adjustments to elements in the multiple regions to locally reduce an entropy associated with the residual data.

28. The computer system as in claim 23, wherein applying the at least one upsample operation includes:

for each of multiple elements in the rendition of the signal at the first level of quality, repeating steps of:

selecting an element to tweak in the downsampled signal at the first level of quality;

tweaking the selected element in different directions;

producing the residual data at the second level of quality based on the tweaked selected element; and calculating an entropy of the residual data at the second level of quality to identify which tweak to the selected element at the first level of quality produces a set of residual data at the second level of quality having the substantially lowest entropy.

29. The computer system as in claim 23, wherein applying the at least one upsample operation further comprises:

applying multiple upsample operations to the downsampled rendition of the signal at the first level of quality; and wherein producing the residual data includes identifying which of multiple upsample options applied to the downsampled rendition of the signal at the first level of quality produces residual data having the substantially lowest entropy.

30. The computer system as in claim 23, wherein the computer system executes the application and further performs operations of:

adjusting settings of elements in the downsampled rendition of the signal at the first level of quality to produce a tweaked rendition of the signal at the first level of quality;

upsampling the tweaked rendition of the signal at the first level of quality to produce the upsampled rendition of the signal at the second level of quality;

applying the residual data to the upsampled rendition of the signal at the second level of quality to produce an intermediate rendition of the signal at the second level of quality;

tweaking elements in the intermediate rendition of the signal at the second level of quality to produce a tweaked rendition of the signal at the second level of quality; and generating a second set of residual data based on a difference between the upsampled rendition of the signal at the second level of quality and the tweaked rendition of the signal at the second level of quality.

31. The computer system as in claim 23, wherein utilizing the at least one downsample operation to produce the downsampled renditions of the signal at successively lower levels of quality further comprises:

selecting a level of quality J in which to downsample the signal, the level of quality J representing a highest level of quality in the hierarchy;

applying a selected downsampling operation to the signal at the level of quality J into a rendition of the signal at a level of quality J-1, the level of quality J-1 being a next lower level of quality beneath the level of quality J;

tweaking settings of values in the rendition of the signal at level of quality J-1 to identify a tweaked rendition of the signal at the level of quality J-1 that reduces an entropy of residual data needed to reconstruct the signal at level of quality J.

32. The computer system as in claim 31, wherein the computer system executes the application and further performs operations of:

testing which of multiple possible upsample operations and tweaked settings of values in the rendition of the signal at level of quality J-1 reduces an entropy of residual data needed to reconstruct the signal at level of quality J.

* * * * *